United States Patent
Mühlhäuser et al.

(10) Patent No.: US 8,495,492 B2
(45) Date of Patent: Jul. 23, 2013

(54) DISTRIBUTED INTERACTIVE AUGMENTATION OF DISPLAY OUTPUT

(75) Inventors: Eberhard Max Mühlhäuser, Ober-Ramstadt (DE); Christoph Trompler, Steyr (AU); Georg Turban, Flörsheim (DE)

(73) Assignee: Technische Universität Darmstadt, Darmstadt (DE)

( * ) Notice: Subject to any disclaimer, the term of this patent is extended or adjusted under 35 U.S.C. 154(b) by 533 days.

(21) Appl. No.: 11/686,279

(22) Filed: Mar. 14, 2007

(65) Prior Publication Data

US 2007/0220412 A1 Sep. 20, 2007

Related U.S. Application Data

(60) Provisional application No. 60/782,586, filed on Mar. 14, 2006.

(51) Int. Cl.
*G06N 3/00* (2006.01)

(52) U.S. Cl.
USPC .......................................................... 715/273

(58) Field of Classification Search
USPC ................. 715/202, 203, 204, 230, 233, 718, 715/730, 731, 732, 751, 759, 200, 273
See application file for complete search history.

(56) References Cited

U.S. PATENT DOCUMENTS

| | | | | |
|---|---|---|---|---|
| 5,600,775 A * | 2/1997 | King et al. | ..................... | 715/203 |
| 5,953,076 A * | 9/1999 | Astle et al. | ..................... | 348/584 |
| 6,006,241 A * | 12/1999 | Purnaveja et al. | ............ | 715/205 |
| 6,173,317 B1 * | 1/2001 | Chaddha et al. | .............. | 709/219 |
| 6,266,100 B1 * | 7/2001 | Gloudemans et al. | ........ | 348/587 |
| 6,332,144 B1 * | 12/2001 | deVries et al. | ......................... | 1/1 |
| 6,404,978 B1 * | 6/2002 | Abe | ................................ | 386/55 |
| 6,452,615 B1 * | 9/2002 | Chiu et al. | ..................... | 715/776 |
| 6,466,275 B1 * | 10/2002 | Honey et al. | .................. | 348/722 |
| 6,484,156 B1 * | 11/2002 | Gupta et al. | .................. | 707/802 |
| 2003/0078973 A1 * | 4/2003 | Przekop et al. | ............... | 709/204 |
| 2005/0081159 A1 * | 4/2005 | Gupta et al. | .................. | 715/751 |
| 2005/0125717 A1 * | 6/2005 | Segal et al. | ................... | 715/512 |
| 2006/0031755 A1 * | 2/2006 | Kashi | ........................... | 715/512 |
| 2006/0048047 A1 * | 3/2006 | Tao | ................................ | 715/512 |
| 2006/0282819 A1 * | 12/2006 | Graham et al. | ............... | 717/113 |
| 2011/0040670 A1 * | 2/2011 | Highland et al. | ............... | 705/37 |

OTHER PUBLICATIONS

International Search Report and Written Opinion, PCT Application No. PCT/IB2007/003478, mailed Jun. 25, 2008, 13 pages.

(Continued)

*Primary Examiner* — Kyle Stork
(74) *Attorney, Agent, or Firm* — Fish & Richardson P.C.

(57) ABSTRACT

Systems, methods, and apparatus are provided for distributed augmentation. In one implementation, a system is provided. The system includes one or more presentation applications, each presentation application operable to provide a presentation output and a plurality of augmentation and presentation control (iAPC) modules operable to provide user augmentations of the presentation output. The system also includes one or more distributed augmentation and presentation management (DAPm) modules operable to separately manage augmentations from the presentation output and to provide an augmented presentation output and one or more display devices for presenting the augmented presentation output.

24 Claims, 3 Drawing Sheets

OTHER PUBLICATIONS

Muhlhauser M. et al. "Learning in the Digital Age: Paving a Smooth Path with Digital Lecture Halls" System Sciences, 2001. HICSS. Proceedings of the 35th Annual Hawaii International Conference on Jan. 7-10, 2001, Piscataway, NJ,USA, IEEE, Jan. 7, 2001, pp. 392-401.

Demeure I. et al. "Mobile Computing to Facilitate Interaction in Lectures and Meetings" Distributed Frameworks for Multimedia Applications, 2005. DFMA '05. First International Conference on Besoncon, France, Piscataway, NJ, USA, IEEE, Feb. 6, 2005, pp. 359-366.

Max Muhlhauser "Lehren and Lernen im Digitalen Horsaal" Thema Forschung, [Online] Jan. 2005, pp. 66-70, Retrieved from the Internet: URL:http://elara.tk.informatik.tu-darmstadt.de/publications/2005/LehrenMax.pdt [retrieved on Jun. 10, 2008].

Bar et al. "Interaction During Lectures Using Mobile Phones" ED-MEDIA 2005, [Online] 2005, pp. 3767-3772, Retrieved from the Internet: URL:http://elara.tk.informatik.tu-darmstadt.de/Publications/2005/ED-MEDIA2005.pdf> [retrieved on Jun. 10, 2008].

Rößling et al. "Enhancing Classroom Lectures with Digital Sliding Blackboards" Proceedings of the 9th Annual Conference on Innovation and Technology in Computer Science Education (ITICSE 2004), [Online] 2004, pp. 218-222, ISBN: 1-58113-836-9, Retrieved from the Internet: URL:http://elara.tk.informatik.tu-darmstad t.de/Publications/2004/p140-roessling.pdf> [retrieved on Jun. 10, 2008].

\* cited by examiner

DISTRIBUTED INTERACTIVE AUGMENTATION OF DISPLAY OUTPUT

CROSS-REFERENCE TO RELATED APPLICATIONS

This application claims priority to U.S. Provisional Patent Application No. 60/782,586, filed on Mar. 14, 2006. The disclosure of the above application is incorporated by reference in its entirety.

BACKGROUND

This specification relates to presentations systems.

Conventional presentation systems typically display output from a presentation application. A presentation application includes any application capable of producing visual output, including, for example, slide presentation applications, word processing applications, and web browsers. Typically, the output is displayed to a group of individual users, for example, during a lecture, meeting, class, or other presentation. Users can include a presenting user managing the presentation as well as participating users. The output from the presentation application can be displayed, for example, on a projected screen or a collection of individual display devices (e.g., computer monitors).

The display output of the presentation application can be redirected from a local display to a display on a non-local device. This redirection is typically referred to as teleporting. For example, a mobile user can export the display output of running applications to other devices as the mobile user changes location. The presentation application does not need to be re-opened or transmitted during teleporting. Teleporting can be applied to the entire display output of the device or to the display output of one or more application specific displays (e.g., application windows).

The display output of the presentation application can also be shared among several users using different devices. This is typically referred to as display multiplexing. Similar to teleporting, the shared display output can be an entire display of a particular device or just one or more particular application windows. Display multiplexing can be used, for example, in electronic learning or helpdesk applications.

Teleportation and display multiplexing typically use virtual frame buffers. A virtual frame buffer (VFB) is an application that mimics a graphics card with respect to both graphics memory and interface to a presentation application. The display output of the presentation application can be routed to the VFB instead of a graphics card memory (i.e., a real frame buffer). The size of the frame buffer corresponds to the display resolution, e.g., 1024 pixels per line×768 pixels per row×3 bytes per pixel. The content of a frame buffer of one device can be sent to a remote virtual frame buffer (rVFB) on a remote device in order to provide the display output to other devices in teleportation and display multiplexing.

SUMMARY

Systems, methods, and apparatus are provided for distributed augmentation. In general, in one aspect, a system is provided. The system includes one or more presentation applications, each presentation application operable to provide a presentation output and a plurality of augmentation and presentation control (iAPC) modules operable to provide user augmentations of the presentation output. The system also includes one or more distributed augmentation and presentation management (DAPm) modules operable to separately manage augmentations from the presentation output and to provide an augmented presentation output and one or more display devices for presenting the augmented presentation output.

Implementations of the system can include one or more of the following features. The system can further include one or more post-processing augmentation/presentation control (pAPC) modules operable to further process the augmented presentation output. The system can further include one or more output devices operable to present the augmented presentation output received from the one or more pAPC modules. The DAPm can further include one or more augmentation layers and providing an augmented presentation output includes overlaying the presentation output with the augmentation layers. Each iAPC can include an augmentation user interface operable to receive augmentations to one or more presentation outputs.

In general, in another aspect, a method is provided. The method includes receiving one or more presentation outputs, receiving a first augmentation to a first presentation output of the one or more of the presentation outputs, generating a first augmented presentation output, the first augmented presentation output corresponding to a combination of the first augmentation and the first presentation output, and displaying the augmented presentation output.

Implementations of the method can include one or more of the following features. The one or more presentation outputs can include multiple threads. Receiving the first augmentation to the first presentation output can include receiving an augmentation associated with particular content of the first presentation output. The first augmentation can be an annotation to the first presentation output. Generating the first augmented presentation output can include generating an augmentation layer corresponding to the received first augmentation, synchronizing the augmentation layer to the first presentation output, and overlaying the synchronized augmentation layer to the first presentation output. The method can further include receiving additional augmentations from one or more users. Each user can be associated with a particular augmentation layer. Each presentation output can be associated with a particular augmentation layer.

Particular embodiments of the subject matter described in this specification can be implemented to realize one or more of the following advantages. A presentation can be distributed among a number of users. Users can augment a presentation application output in real time without modifying the underlying presentation application. Distinct augmentations can be received from multiple users. The augmentations can be separately maintained from the presentation output data. Multi-threaded presentations can be provided including multiple presentation applications or multiple instances of the presentation application. The components for distributed presentation and augmentation can be distributed among multiple devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
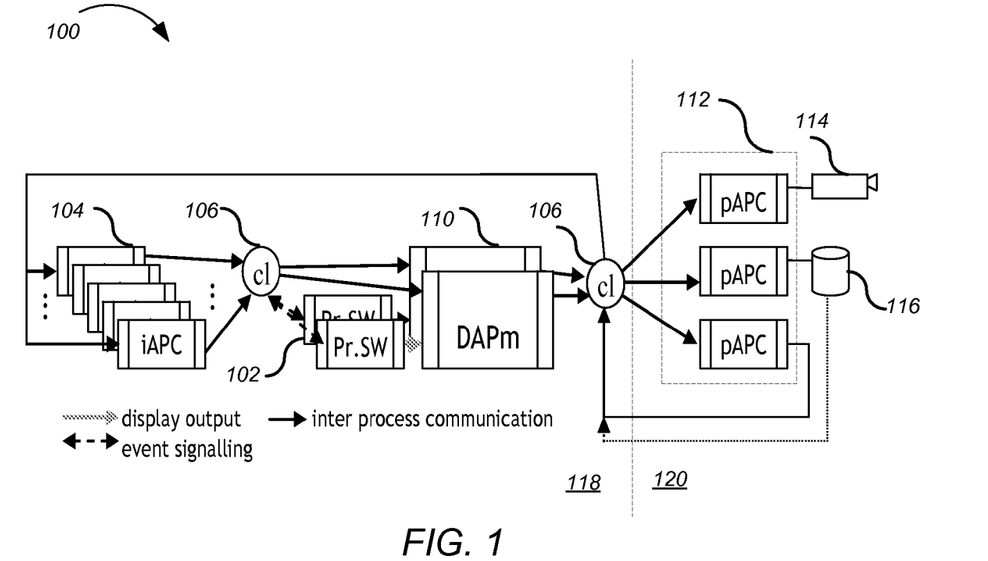
FIG. 1 is block diagram illustrating an example distributed augmented presentation system.

FIG. 1 is block diagram illustrating an example distributed augmented presentation system (the system) 100. The system 100 includes presentation applications 102, interactive augmentation and presentation control (iAPC) modules 104, control logic 106, distributed augmentation and presentation management (DAPm) modules 110, post-processing augmentation/presentation control (pAPC) modules 112, output devices 114, and presentation stream storage 116. The presentation applications 102, iAPC modules 104, and DAPm modules 110, along with associated connections, can be referred to as the interactive part 118 of the system 100. The pAPC modules 112 can be referred to as the post-processing part 120 of the system 100.

Presentation applications 102 are applications capable of producing a visual output. The presentation applications can include, for example, a word processing application, a slideshow application, a web browser, or other application including displayed content. The distributed augmented presentation system 100 can include a number of presentation applications 102. Each presentation application 102 can provide a distinct presentation thread. The presentation threads can be displayed concurrently (e.g., several windows in a display interface) or separately (e.g., separate interface displays).

In some implementations, each presentation application 102 can be a distinct presentation application or separate instances of the same presentation application. Each presentation application 102 produces a presentation output that can be displayed, for example, on a display device or projected onto a screen. The displayed presentation output of each presentation application 102 can change over time, for example, according to user input to the particular application such as changing slides or accessing different web pages in a web browser application.

DAPm modules 110 manage and maintain augmentation data (e.g., pen stroke annotations) separate from the output of each presentation application 102. In some implementations, a single DAPm module 110 can manage several presentation applications 102. In other implementations, there is a corresponding DAPm module 110 for each presentation application 102. The DAPm modules 110 each include one or more VFB's.

One or more of the DAPm modules 110 can be distributed DAPm modules located remotely from the presentation application 102. The distributed DAPm modules can include one or more rVFB's. The DAPm modules 110 receive the presentation output from the respective presentation application 102.

In some implementations, the received presentation output can be transcoded into a presentation output stream. In some alternative implementations, differential encoding can be applied to the presentation output stream. The DAPm module 110 can represent a presentation output stream in a number of configurations including full-resolution and thumbnail representations.

Each DAPm module 110 provides one or more augmentation layers. The augmentation layers can include augmentations from different sources or for different purposes. For example, independent augmentation layers can be generated and combined in various ways. Augmentation layers can be generated by distinct users of the system 100, e.g., using iAPC modules 104 (as described below). The augmentation layers can be updated in real-time according to augmentations received from one or more users.

The augmentation layers can be coupled with the presentation output of the corresponding presentation application 102 to present an augmented presentation output for display. For example, the augmentation layers can be treated as layers having transparent backgrounds which can overlay the presentation output so that both the augmentations on the augmentation layer and the underlying presentation output can be visualized substantially simultaneously.

In some implementations, the particular augmentation layers included with the output stream of the presentation application 102 can vary. For example, in some implementations, the augmented presentation output can include all augmentation layers. In other implementations, however, only particular augmentation layers are included. For example, some augmentations may be presented to all users participating in the presentation while other augmentation may only be presented to particular users.

The content of the presentation output and the augmentation layers remain distinct from each other and can be separately processed. For example, different compression techniques can be applied to the presentation output and the augmentation layers. The underlying presentation output can be modified without modifying the augmentation layers. Similarly, one or more augmentation layers can be modified without modifying the presentation output.

The DAPm modules 10 also manage synchronization between one or more augmentation layers and the presentation output stream. The synchronization can include temporal aspects, location aspects, and semantic aspects. Temporal aspects include a relationship between augmentations and absolute or relative time of a corresponding presentation application output. For example, synchronizing particular augmentations to a particular slide in the presentation. Location aspects include a relationship between augmentations and absolute or relative positions in a virtual display. For example, coordinating the position of a pen drawn augmentation of a slide when overlaying the augmentation layer and the presentation output. Semantic aspects describe the synchronization of the meaning of the augmentation and presentation application content. Semantic aspects can include relationships between conceptual time periods, graphically depicted objects, an abstract concepts represented by the augmentations and the presentation output.

The DAPm modules 10 also manage synchronization between the DAPm modules 110. In particular, the DAPm modules 10 provide for full or partial replication of augmentation layers and the presentation output. Replication can be used, for example, in low bandwidth situations requiring remote users to view lower resolution (e.g., thumbnail) representations of the presentation application output. In another example, particular augmentation layers can be provided only to a subset of the participating users.

In multi-threaded presentations (e.g., multiple instances of the presentation application 102), each presentation output corresponds to a particular VFB/rVFB associated with a corresponding DAPm module 110. Management of multiple presentation threads by the DAPm modules 110 can include on-the-fly creation or deletion of presentations streams, and thereby of VFB's, as needed. Additionally, the paring of VFB's or remote VFB's to DAPM modules 110 can be dynamically changed. For example, in a two thread presentation, the pairs can be swapped. Management of the multiple presentation threads can be reflected in the user interface of one or more iAPC module 104.

Users interact with the system 100 using the iAPC modules 104. The iAPC modules 104 provide an augmentation user interface and augmentation functionality. The iAPC modules 104 include one or more VFB's/rVFB's (depending one whether or not the iAPC modules 104 are distributed) for displaying the presentation content along with visual augmentations. The iAPC modules 104 can be provided to users having permission to augment the output of the presentation applications 102. For example, the presenting user can also augment the presentation. Alternatively, one or more users participating in a presentation can augment the presentation output using the augmentation user interface provided by the iAPC module 104. The augmentation user interface can, for example, be provided as a layer on top of the displayed augmentation layer and presentation output, allowing the user to view the presentation output and augmentations while providing additional augmentations to one or more augmentation layers.

In some implementations, each iAPC module 104 operates in a distributed system on separate devices. For example, each user can view the presentation output and perform augmentations from separate devices (e.g., individual computers).

The augmentations can be provided by the user through the augmentation user interface using a number of different input devices configured to interact with the iAPC modules 104. The input devices can include, for example, pen based devices such as tablet computers, LCD tablets, an interactive whiteboard, or other input devices.

The augmentations provided by the iAPC modules 104 can include, for example, annotations, image processing operations, non-visual additions, and stream inserts. Annotations can include pen strokes (e.g., handwriting, sketches), adding graphical objects (e.g., boxes, circles, or other geometric shapes, pre-defined symbols), keyboard input, and other forms of visual additions to display output. Image processing operations can include operations for enhancing legibility, image transformations, or other graphical operations on the presentation application output.

In some implementations, visual annotations are erased after being generated, for example, in situations where a presenting user provides annotations to highlight a current discussion topic. The visual annotations can be erased according to particular criteria. For example, visual annotations can be erased once new annotations are generated. Alternatively, visual annotations can be erased after a specified amount of time has elapsed (e.g., ten seconds).

Non-visual additions, also referred to as non-primary additions, can include adding metadata, synchronous audio/video recordings (e.g., content from a seminar, lecture, or other audience where the presentation application output was presented), and voice annotations. Stream inserts can include annotations that overwrite VFB memory content (e.g., a blank rectangle of a particular color can be inserted to present an "empty canvas" for annotations). For example, a stream insert can provide an inserted slide between portions of the presentation output for inserting annotations as the sole displayed content. Thus, for example, the presentation application output stream can be switched to the inserted stream and then switched back again to continue the presentation application.

In some implementations, the augmentations provided by the iAPC modules 104 can allow users to control operation of the presentation applications 102. For example, a presenting user can use the augmentation user interface to manipulate a particular presentation application (e.g., by using an input device such as a pen to control the actions of the presentation application). For example, for a slide presentation the presenting user can direct the advancement of slides through the iAPC user interface.

In some implementations, the iAPC modules 104 can allow for different levels of augmentation control. For example, an iAPC module 104 associated with the device of a presenting user facilitating the presentation may have more control over augmentations than an iAPC module 104 associated with the device of a user participating in the presentation. In other implementations, the augmentation user interface is only provided to authorized users, e.g., only for a presenting user's iAPC module 104.

In some implementations, each iAPC module 104 is coupled with a VFB/DAPm or a rVFB/DAPm pair. The coupled iAPC modules 104 and VFB/DAPm modules allow users of the iAPC modules 104 to view the combined presentation application and augmented output. The iAPC modules 104 are interconnected with the DAPm modules 110. Consequently, the iAPC modules 104 receive presentation output from each of the one or more DAPm modules 110. Additionally, each iAPC module 104 can provide augmentations to one or more of the DAPm modules 110. Furthermore, the interconnection allows the DAPm modules 110 to maintain augmentation layers corresponding to user augmentations input from the iAPC modules 104 (e.g., for display with the presentation output).

In some implementations, a single iAPC module 104 can include several coupled DAPm modules, each DAPm module including a VFB or rVFB. The iAPC module 104 can allow the user of the iAPC module 104 to switch interfaces associated with the content of each coupled DAPm modules (e.g., output from different presentation applications).

Additionally, multi-threaded presentations can be supported when a single iAPC module 104 is coupled to more than one DAPm module. For example, different presentation applications 102 (or instances of the same presentation application 102), associated with a DAPm module of the iAPC module 104, and therefore can be viewed and annotated through a single iAPC module 104. Examples for using multi-threaded presentations include active table of contents (TOC), subject-centered presentations, and telepresence setups.

Active TOCs include presentations where a table of contents can be referred and/or advanced at different occasions. The table of contents can be presented, therefore, as a separate thread while the main presentation is presented on another thread. Subject-centered presentations include presentations where different subject matter of the presentation are presented and advanced in separate threads of the presentation. The different subject matters can be included as part of separates sets of images, live data, videos, or other media content and the slides or other presentation materials that visually underline the presentation about the subject matter. Telepresence setups include presentations were live remote participating users (e.g., an expert) contribute to a presentation and times that are not predetermined as part of the presentation. The particular participating users can be presented on a separate thread from the main presentation data.

The pAPC modules 112 provide a final form for the augmented presentation output receive from the DAPm modules 110. The augmented presentation output can be transmitted to one or more output devices 114, including, for example, projectors, display screens, and other display devices.

In some implementations, the augmented presentation output can be stored in one or more storage devices 116. The augmented presentation output can be stored separately according to the different components of the output or together. For example, the output stream from the presentation application can be stored together or separately from the augmentation layers. Synchronization data can also be stored for use in later replay of the augmented presentation output and later augmentations.

The augmented presentation output can be stored in a streaming format or in a digital video format such as MPEG. A video stream of the augmented presentation output can be generated, for example, using a series of still images at fixed images, for example, according to video standards such as MPEG-1 or MPEG-4. In other implementations, the video stream can be generated with a series of stills at variable intervals corresponding to particular display events. In some implementations, the augmented presentation output is stored in a final form that cannot be altered. In other implementations, the stored output can be modified at a later time.

The post-processing provided by the pAPC modules 112 can include non-interactive augmentations. For example, image enhancement for the presentation application output, the augmented output, or a combination of the two. Non-interactive augmentations can also include adding computed metadata.

In some implementations, the augmented presentation output can be routed back to the interactive components, e.g., one or more of the iAPC modules 104, for displacing the post-processing output to iAPC users or to facilitate further modifications.

In some implementations, the pAPC modules 112 can present the current augmented presentation output as part of a presentation surface. The presentation surface can be configured to present a number of tiles of a projection area as a single large area. In some implementations, the presentation surface is referred to as a hardware tile and represents the total display area available. A number of display tiles can be presented on the hardware tile.

The presentation surface can include a number of projection areas and a number of devices. The presentation surface can then be divided into a number of individual display tiles or windows having a configurable size. For example, for an output device 114 such as a projector, the projection can operate with a particular aspect ratio of 16:9. Four tiles can be included in the presentations area for the projector, e.g., one full height tile and threes smaller (i.e., ⅓ height) tiles, each with an aspect ratio of 4:3.

Each individual display tile, t, can display different data. For example, a tile can display a current augmented display output including the presentation application output and associated augmentation layers. In some implementations, each tile can be assigned a different presentation thread in a multi-threaded presentation. For example, different tiles can be assigned to display the presentation output, and corresponding augmentations, for a particular thread. For example, one thread can include the slides of a slideshow presentation while a second thread includes a table of contents. Each can be displayed simultaneously to an audience of users on separate tiles.

Tiles can also display historical data. The historical data can include, for example, past presentation output. In some implementations, the historical data also includes the corresponding past augmentation data. In some implementations, multiple distinct histories are displayed in separate tiles. For example, a first history can display data of the presentation application immediately prior to the current presentation application output (e.g., the last slide of a presentation prior to the current slide). A second, third, etc., history can display past sides in separate tiles in order of slide presentation. Having display tiles with history output provides users viewing the presentation to visually review recently presented content. Thus, the users and the presenter can refer to recently presented content in the context of the current presentation output.

History snapshots can be taken, for use in the display tiles, according to particular criteria. For example, they can be taken with explicit user command in the IAPC module 104 (e.g., the presenting user can select particular snapshots to be taken). Alternatively, the snapshots can be pre-configured according to particular presentation application events, for example, when a presenting user switches slides of a presentation.

Tiles can also display auxiliary information handled by the system 100. For example, the auxiliary information can include connection requests (e.g., call-ins) from users to participate in the presentation. Thus, tiles for the presenter or other administrative user can see a display indicating the users participating or waiting to participate. Additionally, the tiles can also display arbitrary information that is not looped through system, for example, particular windows of a device user interface that are opaque to the system 100, e.g., which remain under the individual control of the particular device's operating system and not the system 100.

Control logic 106 links one or more groups of components of the system 100. The control logic 106 controls forward and backward loops between components including particular VFB's/rVFB's, DAPm modules 110, iAPC modules 104, and pAPC modules 112. For example, the control logic can include pairing VFB's or remote VFB's and zero or more DAPm modules 110. Additionally, each VFB/DAPm module pair can be linked to zero or one iAPC modules 104 and/or pAPC module 112.

For multi-threading implementations, more than one DAPm/VFB (or DAPm/rVFB) can be paired with an iAPC module 104 and/or pAPC module 112. The control logic can provide for directing the presentation output to a particular VFB or rVFB. Additionally, the control logic can direct particular events, e.g., event signaling of commands from the iAPC module 104 to the presentation application 102 to display a next slide or notifying the iAPC module 104 that the presentation application 102 has presented the next slide. Additionally, control logic 106 can provide communication of final form output from the pAPC modules 112 to the iAPC modules 104. Furthermore, the control logic 106 can send the iAPC augmentations to DAPm modules 110 to maintain the augmentation layers.

The control logic 106 provides communication and event routing between the system components suing, for example, point-to-point connections, multicast, or both. The control logic 106 determines format, update rules, and constraints applied to distributed information. The distributed information includes the presentation application output (e.g., frame buffer content) and augmentation information. For example, the presentation application output can be provided at a full update rate (i.e., as a quasi continuous stream), at a fixed frame rate, or for discrete events such as a change in the presentation application output (e.g., a slide change) or in response to user input (e.g., a request of the presenting user).

The control logic 106 also provides for distributed components of the system 100. For example, network links between different devices to support different distributed scenarios including presentation applications 102 can operate on separate devices from other components of the system 100, each display devices 114 can each be associated with a different device, different DAPm modules 110 can receive and operate on the same presentation software output such that users (presenting and participating) can provide augmentations to the presentation.

In some implementations, particular users can be granted rights to manipulate the control logic 106. Rights can be granted to individual users, or to particular user roles. In some implementations, the system 100 is joined with an authorization system to provide account management of the system 100.

Figure 2:
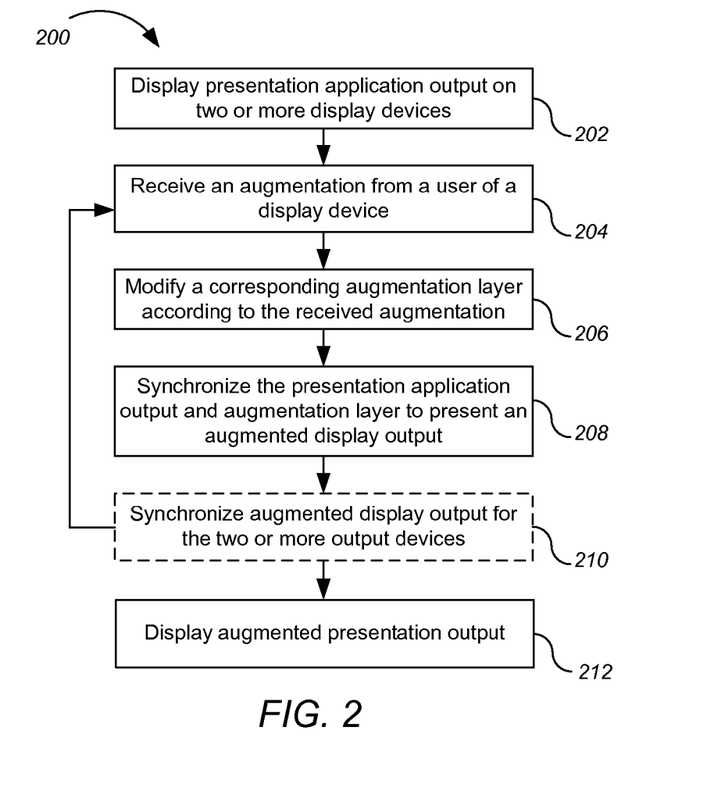
FIG. 2 is a flowchart illustrating an example process for distributed augmented presentation.

FIG. 2 is a flowchart illustrating an example process 200 for distributed augmented presentation. For convenience, the process 200 is described with reference to a system that will perform the process 200 (e.g., system 100).

The system displays presentation application output on two or more output devices (step 202). For example, the presentation application (e.g., presentation application 102) can provide a presentation output including a set of slides. The slides can be displayed on multiple output devices (e.g., output devices 114), for example, multiple computers, projectors, other display devices, and a combination of devices. The presentation output can be distributed to the different output devices using one or more DAPm modules (e.g., DAPm modules 110). Additionally, the presentation output can be distributed to each of the iAPC modules 104.

The system receives an augmentation from a user of a display device (step 204). The augmentation can be received through an augmentation user interface of an iAPC module (e.g., iAPC module 104). The augmentation can be provided by a presenting user or by a user participating in the presentation. The augmentation can include, for example, using a pen device to annotate the current slide shown by the output devices.

The system modifies a corresponding augmentation layer according to the received augmentation (step 206). The augmentation layers are distinct from the presentation application output. In some implementations, the augmentation layer is a separate layer with a transparent background such that the augmentation layer can overlay the presentation application output. There can be one or more augmentation layers, for example, for one or more different users. The augmentation layer or layers corresponding to the user augmentation is modified, for example, to illustrate the user drawn annotation.

The augmentation layer can be maintained, for example, by a DAPm module that receives the augmentation from the iAPC module. The augmentation can also be associated with a duration to be maintained in the augmentation layer. For example, an annotation may only be drawn to the augmentation layer for a particular period of time or until a new augmentation is generated.

The system synchronizes the presentation application output and augmentation layer to present an augmented display output (step 208). The synchronization can include overlaying the presentation output and the augmentation layer for display as a single augmented output. Thus, for example, for an annotation drawn on a slide of the presentation, the displayed output would show both the slide and the annotation appearing drawn on the slide.

The synchronization can also include linking the annotation to a particular event associated with the presentation output. For example, the augmentation layer can be synchronized to the presentation output such that when the presentation changes displayed content e.g., by switching to a next slide, the particular annotation in the augmentation layer is no longer displayed. The augmentations in the augmentation layer can be stored so that they can be re-displayed at a later time, for example, retuning to the slide later in the presentation.

The system optionally synchronizes the augmented display output for each of the two or more output devices (step 210). The DAPm modules can provide for full or partial replication of augmentation layers and the presentation output. Replication can be used, for example, in low bandwidth situations requiring remote users to view lower resolution (e.g., thumbnail) representations of the presentation application output. In another example, particular augmentation layers can be provided only to a subset of the participating users.

The steps 204-210 can repeat for each augmentation. Additional augmentations can be received from the same user or different users. The additional augmentations can be maintained by the same augmentation layer or by different augmentation layers.

The system displays the augmented presentation output (step 212). For example, after modifying the augmentation layer to correspond with the received augmentation, the DAPm module can transmit the augmented presentation output to one or more pAPC modules for final processing. The pAPC modules can transmit the final augmented presentation output to one or more display devices, storage devices, as well as looping the final augmented presentation output to one or more iAPC modules.

Figure 3:
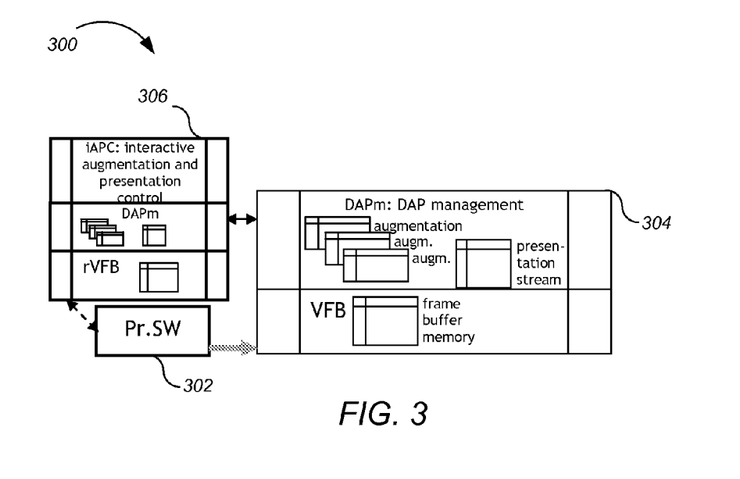
FIG. 3 is a block diagram illustrating an example interactive part of the distributed augmented presentation system.

FIG. 3 is a block diagram illustrating an example interactive part 300 of the system. In particular, FIG. 3 shows additional details of the interactive part of the distributed augmentation system 100 shown in FIG. 1. The interactive part 300 includes a presentation application 302, a DAPm module 304 and an iAPC module 306. The DAPm module 304 can be local to the presentation application 302 and includes a VFB for displaying the presentation application output. The DAPm module 304 also includes one or more augmentation layers and receives the presentation application output stream. The DAPm module 304 can overlay the augmentation layers and the presentation application output stream to provide an augmented presentation output to one or more output devices.

The iAPC module 306 includes a DAPm module 304 and a remote VFB for displaying the augmented presentation output. The iAPC module 306 provides an augmentation user interface for receiving augmentations from users. The iAPC 306 includes a DAPm module for managing augmentations generated using the augmentation user interface and for communicating those augmentations to the DAPm module 304. The received augmentations are transmitted to the DAPm module 304, which modifies the corresponding augmentation layer and synchronizes the augmented presentation output. The presentation output with changed augmentations is sent to the IAPC 304 for display using the rVFB.

Figure 4:
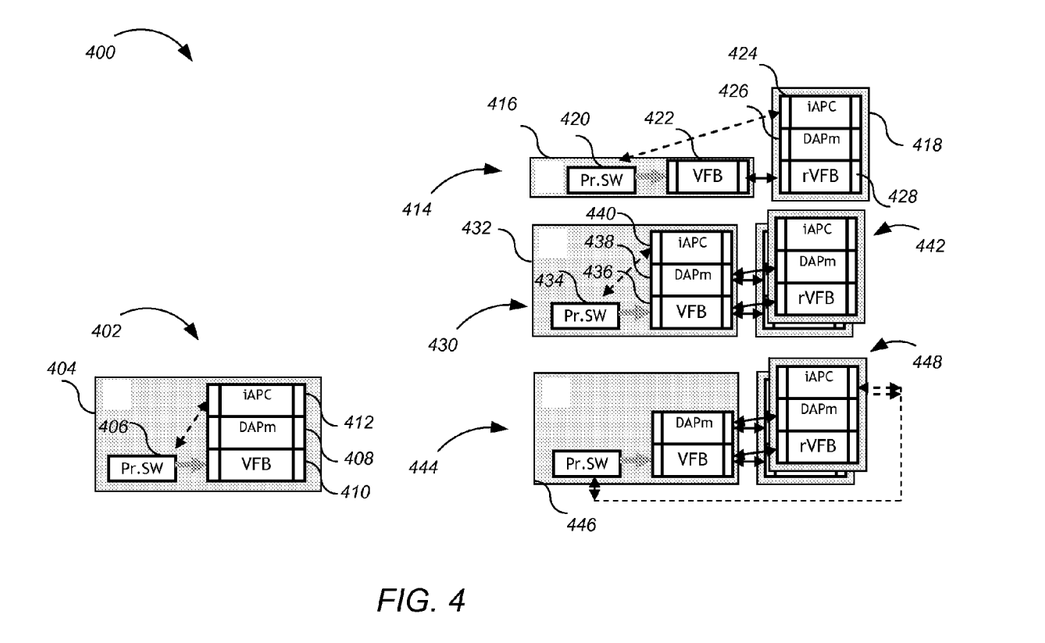
FIG. 4 is a block diagram illustrating example configurations for the interactive part of the distributed augmented presentation system.

FIG. 4 is a block diagram 400 illustrating four example configurations for the interactive part of a distributed augmentation presentation system. Configuration 402 shows a system residing all on one device 404. The device 404 includes presentation application 406, DAPm 408, VFB 410, and an iAPC 412. In some implementations having multiple threads, the device 404 can include additional DAPm modules and VFB's for each thread. The single device configuration 402 allows a user, for example, the presenting user, to augment the presentation application output from the iAPC 412 augmentation interface of the same device on which the presentation application 406 is running. The augmented output can be distributed to one or more output devices, for example, corresponding to users in an audience for the presentation provided by presentation application 406.

Configuration 414 shows a system including a first device 416 and a second device 418. The first device 416 includes presentation application 420 and VFB 422. The second device 418 includes an iAPC 424, DAPm 426, and rVFB 428 for displaying output to the augmentation user interface. In configuration 414, a presentation can be provided on the first device 416 while augmentations to the presentation can be provided on the second device 418. The VFB 422 on the first device 416 provides a display of the augmented presentation output on the first device 416 (e.g., for the user providing the presentation using presentation application 420). The remote VFB 428 on the iAPC 424 provides for the display of the augmented presentation output on the second device 418. The DAPm module 426 on the second device 418 manages the augmentations provided by the user through the augmentation user interface of the iAPC 424.

Configuration 430 shows a more distributed system that includes a first device 432 that includes presentation application 434, a VFB 436, DAPm 438, and IAPC 440. The first device 232 can be the device of the presenting user allowing the presenting user to manage the presentation and make augmentations to the presentation application output. Configuration 430 also supports remote augmentations on remote devices 442 (e.g., participating user that can augment the presentation output). The remote devices 442 provide for remote augmentations by users. Each remote device 442 includes a corresponding IAPC module, DAPm module, and rVFB for managing and displaying augmentations to the presentation output.

Configuration 444 shows a system that includes a first device 446 that provides the presentation application output and a number of remote devices 448 that provide for user augmentations of the presentation application output. The first device 446 includes the presentation application and a local DAPm and VFB for providing the local display of the augmented presentation output to the local user (e.g., the presenter). Each remote device 448 includes an iAPC, a DAPm, and a rVFB facilitating the remote presentation and augmentation of the presentation output.

Figure 5:
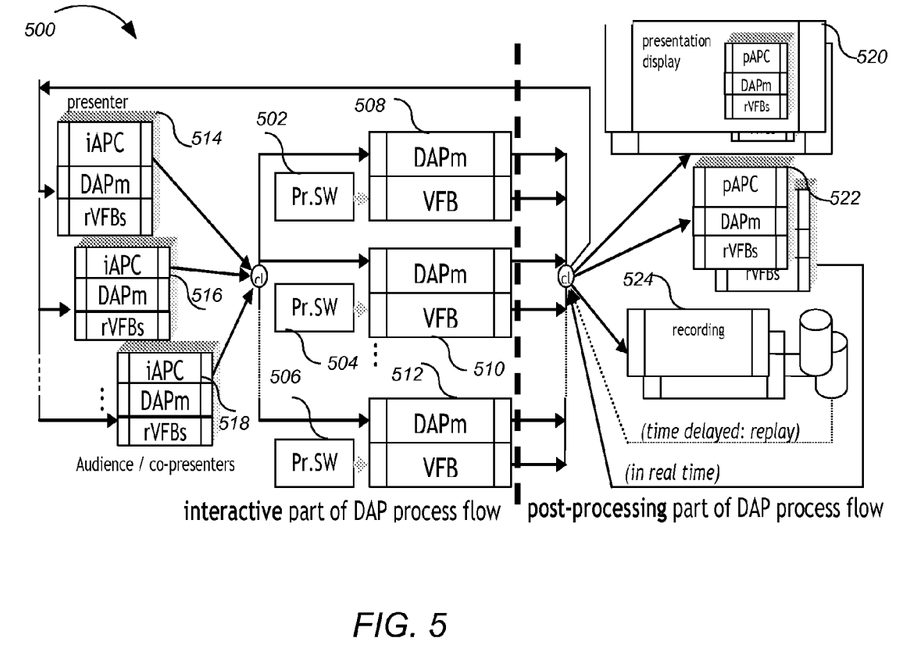
FIG. 5 is a block diagram illustrating an example distributed augmented presentation system with post processing.

FIG. 5 is a block diagram illustrating an example distributed augmented presentation system 500 with post-processing included. The system 500 is similar to system 100 shown in FIG. 1, however, system 500 includes three presentation threads illustrated by presentation applications 502, 504, and 506. The presentation output from each thread is sent to a corresponding DAPm NVFB pair. Thus, the presentation output from presentation application 502 is transmitted to DAPm NVFB pair 508, the presentation output from presentation application 504 is transmitted to DAPm NVFB pair 510, and the presentation output from presentation application 506 is transmitted to DAPm NVFB pair 512. The DAPm NVFB pairs 508-512 also manage augmentation layers to provide an augmented display output to other components (e.g., iAPC modules and pAPC modules).

System 500 includes three separate iAPC modules 514, 516, and 518. Each IAPC module includes one or more DAPm module and remote VFB pairs each hosting one or more of the presentation threads from the presentation applications 502, 504, and 506. In some implementations, one of the iAPC modules (e.g., iAPC module 514) can correspond to the augmentation interface for a presenting user. The other iAPC modules (e.g., iAPC modules 516 and 518) can correspond to the augmentation interfaces for participating users or other presenting users. User at each IAPC modules 514-518 can augment the presentation output. Augmentations are transmitted to the DAPm module corresponding to the augmented thread.

The post-processing part of the system 500 shows three types of post-processing categories. The first post-processing category includes final output post processing 520. Final output post-processing 520 can include providing the final presentation output to display devices (e.g., projectors, display monitors). In some implementations, the final presentation output includes a number of display tiles for showing different presentation threads and/or history tiles concurrently, as described above.

The second post-processing category includes one or more pAPC modules 522 for processing augmentation and/or presentation streams in real time, for example, to provide additional and/or enhances information or visualization. Results can be fed back into the system 500 processing loop in real time.

The third post-processing category shown in the system 500 includes one or more pAPC modules 524 that transcode augmentations and presentations outputs into final formats such as streaming formats or digital-video formats. The pAPC modules 524 can transmit the final formats to a particular storage device (e.g., a central database) for later revisions or presentation.

Figure 6:
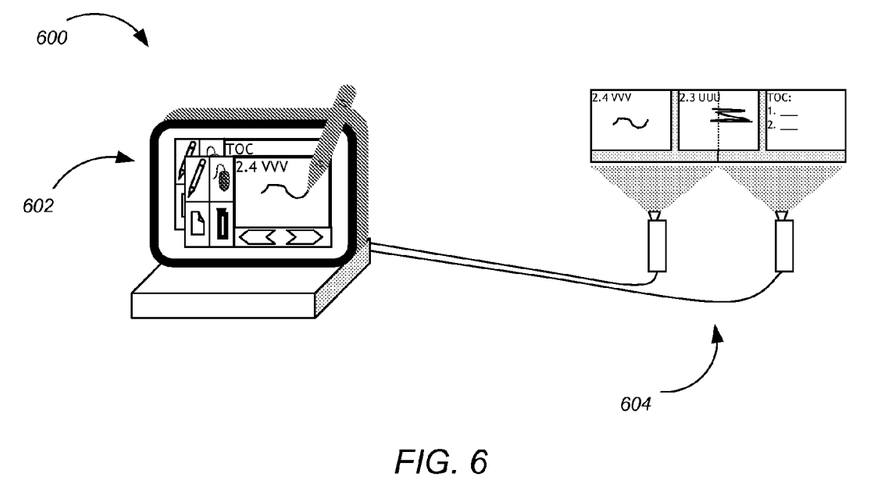
FIG. 6 is a block diagram illustrating an example of a distributed augmentation system display.

FIG. 6 is a block diagram illustrating an example of augmentation and display using the distributed augmentation presentation system 600. System 600 includes a first device 602 representing the display of a device with an iAPC module. In some implementations, the first device 602 corresponds to a single device configuration e.g., first configuration 402 of FIG. 4. The first device 602 presents two presentation threads on a display. The first thread shows current slide 2.4 being presented by a presentation application. The current slide 2.4 follows the previous slide 2.3. The second thread shows a table of contents. The table of contents is presented using a second instance of the presentation application.

The two presentation threads can be provided, for example, as separate windows on the display of the first device 602. The two windows can be presented within an augmentation user interface. The windows can present the presentation output from each respective thread as well as any augmentations. In some implementations, sub-windows present the augmented output separately from the presentation application output.

Interaction controls are also displayed in the augmentation user interface. Examiner interaction controls include icons provided for switching between different annotation modes. For example, one annotation mode can use a pen device directly on the display output of the presentation software to provide annotations. Another annotation mode can allow the use of a pen device to control menus or other aspects of the user interface.

Another interaction control allows the user to insert an empty slide into the presentation output. The empty slide functions as a blank canvas for entering augmentations. After augmenting the empty slide, the user can select another interaction control to return to the presentation output windows. Additional controls can be provided, for example, providing different pen styles or graphics. In one implementation, different interaction control can be toggle controls, where a first selection performs one function and a second selection results in a second function, where the two functions can be switched by selecting the control. For example, the first selection of an empty slide control can present the blank canvas while a second selection of the empty slide control returns to the previous windows.

Additional controls can allow the presenting user to operate the presentation software from within the augmentation user interface, for example, to move slides forward or backward in the presentation.

System 600 also illustrates one implementation for providing the display output to an audience of users. A pair of projection devices 604 is shown. The projection devices 604 together present a hardware tile including three display tiles, where the center display tile is half presented by the first projection device and half by a second projection device of the pair of projection devices 604. One display tile shows the current slide of the presentation output combined with any augmentations to the current slide (e.g., the augmented presentation output). A second display tile shows the previous slide (e.g., slide 2.3) including any augmentations to the previous slide. Finally, the third display tile shows the second thread (e.g., the table of contents).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
    one or more presentation applications, each presentation application operable to provide a respective presentation output, wherein the presentation output is configured to be displayed or projected;
    a plurality of augmentation and presentation control (iAPC) modules operable to provide user augmentations of the presentation output, the user augmentations being associated with the presentation output without modifying the presentation output, wherein each iAPC includes a respective remote virtual frame buffer each virtual frame buffer hosting one of the presentation threads from the one or more presentation applications, wherein the iAPC provides an augmentation user interface to users having permission to augment the presentation output as a separate layer over a presented augmentation layer and the presentation output;
    one or more distributed augmentation and presentation management (DAPm) modules operable to separately manage augmentations from the respective presentation output received from the plurality of iAPC modules, wherein the DAPm modules each include one or more virtual frame buffers such that the augmentations are separately maintained in one or more augmentation layers distinct from the presentation output received from the one or more presentation applications and to provide an augmented presentation output, where the augmented presentation output provides synchronous presentation of the augmentations and the presentation output; and
    one or more display devices for presenting the augmented presentation output, wherein each of the one or more display devices is coupled to one or more iAPC modules, and wherein the iAPC modules receive the augmented presentation output from one or more DAPm modules.

2. The system of claim 1, further comprising:
    one or more post-processing augmentation/presentation control (pAPC) modules operable to further process the augmented presentation output, including providing non-interactive augmentations.

3. The system of claim 2, further comprising:
    one or more output devices operable to present the augmented presentation output received from the one or more pAPC modules.

4. The system of claim 2, wherein the one or more pAPC modules present the augmented presentation output as part of a presentation surface configured to present a number of tiles of a projection area as a single large area and wherein each tile displays different data.

5. The system of claim 1, wherein providing the augmented presentation output includes overlaying the presentation output with the augmentation layers.

6. The system of claim 1, where the DAPm initially provides the presentation output for presentation to one or more users; receives augmentations to the presentation output from the iAPC; and combines the presentation output with the received augmentations to provide the augmented presentation output.

7. The system of claim 1, wherein management of multiple presentation threads by the DAPM module includes creation or deletion of presentation streams and corresponding VFB's as needed.

8. The system of claim 7, wherein each thread is associated with a VFB/DAPm pair and wherein the pairing can be dynamically changed.

9. The system of claim 1, wherein providing synchronous presentation includes synchronizing temporal aspects, location aspects, and semantic aspects of the augmentations and the presentation output.

10. The system of claim 1, wherein the DAPm modules manage synchronization between DAPm modules.

11. A method comprising:
    receiving one or more presentation outputs, each presentation output of the one or more presentation outputs being associated with a particular presentation application and configured for display;
    receiving a first augmentation to a first presentation output of the one or more of the presentation outputs, the first augmentation being associated with the first presentation output without modifying the first presentation output, wherein the first augmentation is received at an augmentation user interface presented to users having permission to augment the presentation output as a separate layer over a presented augmentation layer and the presentation output, and wherein each of the one or more presentation outputs is hosted by a respective remote virtual frame buffer;
    generating, using one or more processors, a first augmented presentation output, the first augmented presentation output received from a first presentation application, the first augmented presentation output corresponding to a combination of the first augmentation and the first presentation output, where the combination provides synchronous presentation of the first augmentation and first presentation output while separately maintaining the first augmentation in a distinct augmentation layer from the first presentation output such that the first augmentation and first presentation output are independent streams; and providing the augmented presentation output for display.

12. The method of claim 11, where the one or more presentation outputs comprise multiple threads.

13. The method of claim 11, where receiving the first augmentation to the first presentation output includes receiving an augmentation associated with particular content of the first presentation output.

14. The method of claim 13, where the first augmentation is an annotation to the first presentation output.

15. The method of claim 11, where generating the first augmented presentation output includes:
generating an augmentation layer corresponding to the received first augmentation;
synchronizing the augmentation layer to the first presentation output; and
overlaying the synchronized augmentation layer to the first presentation output.

16. The method of claim 15, where synchronizing the augmentation layer to the first presentation output includes synchronizing temporal aspects including a relationship between the first augmentation and a time of a corresponding portion of the presentation output.

17. The method of claim 11, further comprising:
receiving additional augmentations from one or more users.

18. The method of claim 17, where each user is associated with a particular augmentation layer.

19. The method of claim 17, where each presentation output is associated with a particular augmentation layer.

20. The method of claim 11, further comprising:
displaying an output corresponding to each presentation output as separate tiles.

21. The method of claim 11, further comprising:
displaying the presentation output without the first augmentation on a first display device associated with one or more users while displaying the augmented presentation output on a second display device.

22. The method of claim 11, further comprising:
generating a second augmentation; and
determining for each of a plurality of display devices whether to include the second augmentation in the augmented presentation output.

23. The method of claim 11, where the first augmentation expires a specified time after display in the augmented presentation output.

24. The method of claim 11, where the first augmentation is removed when a second augmentation is generated.

* * * * *